United States Patent
Taylor

(10) Patent No.: US 12,235,956 B2
(45) Date of Patent: Feb. 25, 2025

(54) SYSTEMS AND METHODS FOR GENERATING MALWARE FAMILY DETECTION RULES

(71) Applicant: Target Brands, Inc., Minneapolis, MN (US)

(72) Inventor: Nicholas Taylor, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 224 days.

(21) Appl. No.: 18/098,984

(22) Filed: Jan. 19, 2023

(65) Prior Publication Data

US 2024/0248988 A1   Jul. 25, 2024

(51) Int. Cl.
*G06F 21/56* (2013.01)

(52) U.S. Cl.
CPC ............ *G06F 21/564* (2013.01); *G06F 21/56* (2013.01)

(58) Field of Classification Search
CPC ............................... G06F 21/564; G06F 21/56
See application file for complete search history.

(56) References Cited

U.S. PATENT DOCUMENTS

| | | | |
|---|---|---|---|
| 7,284,273 B1 * | 10/2007 | Szor | G06F 21/564 726/22 |
| 7,519,998 B2 | 4/2009 | Cai et al. | |
| 7,966,658 B2 | 6/2011 | Singh et al. | |
| 8,065,729 B2 | 11/2011 | Yi et al. | |
| 8,261,344 B2 | 9/2012 | Godwood et al. | |
| 8,375,450 B1 * | 2/2013 | Oliver | G06F 21/564 713/181 |
| 8,806,641 B1 | 8/2014 | Tan et al. | |
| 9,483,643 B1 | 11/2016 | Yun | |
| 9,542,556 B2 | 1/2017 | Sanders et al. | |
| 10,867,039 B2 | 12/2020 | Gordeychik et al. | |
| 2007/0240222 A1 * | 10/2007 | Tuvell | H04W 12/128 726/24 |

(Continued)

OTHER PUBLICATIONS

Cho, In Kyeom, et al. "Malware analysis and classification using sequence alignments." Intelligent Automation & Soft Computing 22.3: 371-377. (Year: 2016).*

(Continued)

*Primary Examiner* — John M MacIlwinen
(74) *Attorney, Agent, or Firm* — Barnes & Thornburg LLP

(57) ABSTRACT

Disclosed are techniques for identifying unique byte sequences for malware families. A method can include receiving a collection of malware signature samples, grouping the samples in the collection by malware family, and for each family: identifying unique byte sequences in the samples and a number of instances of the unique byte sequences across the samples, adding the identified unique byte sequences to a dictionary for the malware family, retrieving a dictionary of at least another malware family, comparing the unique byte sequences in the dictionary for the malware family with byte sequences in the dictionary of the another malware family, identifying a conflicting byte sequence based on (i) the comparison and (ii) determining that a number of instances of the conflicting byte sequence is more than a threshold number of instances, and removing the identified conflicting byte sequence from the dictionary for the malware family.

20 Claims, 9 Drawing Sheets

(56) References Cited

U.S. PATENT DOCUMENTS

| | | | |
|---|---|---|---|
| 2013/0097706 A1* | 4/2013 | Titonis | G06F 21/566 |
| | | | 726/22 |
| 2014/0165198 A1* | 6/2014 | Altman | G06F 21/561 |
| | | | 726/23 |
| 2016/0094564 A1 | 3/2016 | Mohandas et al. | |
| 2016/0323295 A1* | 11/2016 | Joram | H04L 63/145 |
| 2018/0196943 A1* | 7/2018 | Coroiu | H04W 12/128 |
| 2019/0005238 A1* | 1/2019 | Breitenbacher | G06F 21/563 |
| 2021/0304013 A1* | 9/2021 | Zhang | G06N 5/01 |
| 2023/0100947 A1* | 3/2023 | Chen | G06N 5/02 |
| | | | 726/21 |

OTHER PUBLICATIONS

Di Laurea, Tesi. "Automatic Malware Signature Generation". Politecnico di Torino. (Year: 2021).*

Saha, Shoumik, Sadia Afroz, and Atif Rahman. "MALIGN: Adversarially Robust Malware Family Detection using Sequence Alignment." CoRR. (Year: 2021).*

Bilstein & Plohmann, "YARA-signator: Automated generation of code-based YARA rules," J. Cybercrime Digit, 2019, 5(1):1-3.

Raff et al., "Automatic Yara Rule Generation Using Biclustering," Proceedings of the 13th ACM Workshop on Artificial Intelligence and Security, Nov. 2020, 71-82.

* cited by examiner

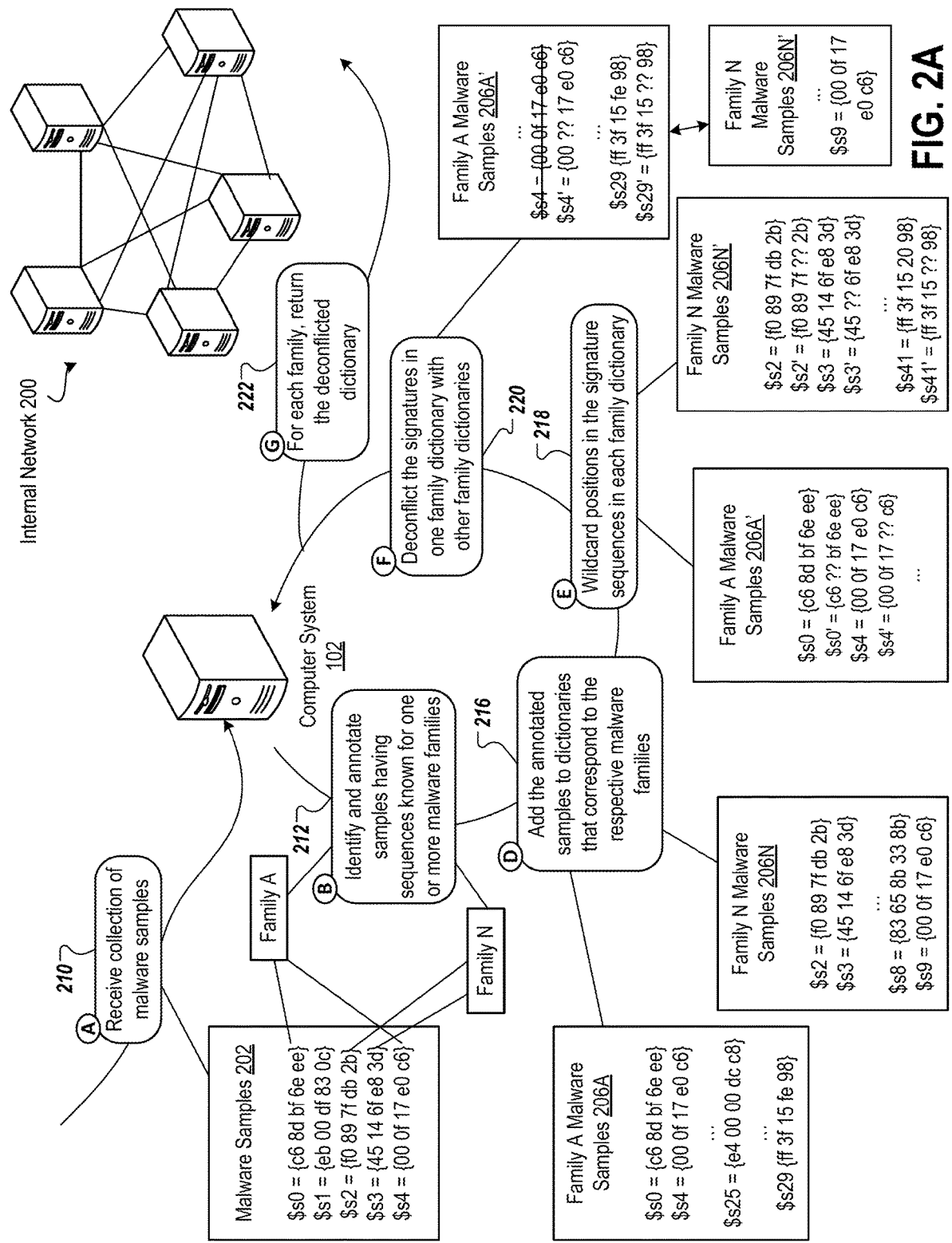

SYSTEMS AND METHODS FOR GENERATING MALWARE FAMILY DETECTION RULES

TECHNICAL FIELD

This document generally describes devices, systems, and methods related to automatically identifying byte sequences unique to different malware families and generating malware detection rules for those families based on the respective unique byte sequences.

BACKGROUND

Malware can exist in files or other network traffic. Those files or network traffic can enter a computing system, device, and/or network of systems or devices to infect such components, which can cause any of a variety of problems, such as cybersecurity breaches, ransomware, and others. Malware on a particular device in an internal network, such as an enterprise infrastructure, can also spread to other devices connected to the particular device or otherwise in communication in the internal network.

Malware can be categorized into different groups called malware families. A malware family can be made up of malware applications, programs, or files having some level of code base overlap or other similarities. Grouping malware as a family can broaden the scope of a single piece of malware as it alters over time, thereby creating a new piece of malware with distinct family traits. Malware that is part of a family can share common characteristics, such as similar or same byte sequences in malware files, attribution to same author(s), and/or similar attack techniques. Malware files can adapt or change over time, thereby making it challenging to detect variations of malware files before they infiltrate a system, device, or network.

Malware detection systems can be implemented by enterprises, organizations, or other entities to determine whether malicious files are attempting to infiltrate or have infiltrated systems, devices, and/or networks. A malware detection system can use various techniques to detect malware. For example, the malware detection system can use signature-based detection techniques, check-summing, application allow-listing, and/or machine learning behavioral analysis.

SUMMARY

The document generally describes systems, methods, and techniques for identifying byte sequences in malware files that are unique to a particular malware family and leveraging the family's unique byte sequences (e.g., 3 bytes, 4 bytes, 5 bytes, 8 bytes, 16 bytes) to generate and maintain malware detection rules for that family. For example, malware detection rules can be used by various components within a network to automatically and quickly detect malware that is attempting to be transmitted to devices within the network, and can use those automatic detections to prevent such malware attacks. A well-crafted malware detection rule can permit for efficient processing and determination of malware and can also minimize the number of false negatives (e.g., incorrect identification that malicious network traffic or other files is not malware) and/or false positives (e.g., incorrect identification that benign network traffic or other files is malware). When expanding individual malware detection rules to a set of rules that work in concert to identify malware across a population of potential malware threats, rule generation and maintenance can become even more challenging as the possibility of false positives and/or negatives can increase due to a larger pool of features that are being searched for via the rules. The disclosed technology provides for automated determination and generation of a set of rules that minimize false positives and false negatives by considering and evaluating the byte-space within which all of the rules operate when generating the rules. As a result, the rule set that is generated can help to minimize false positives and false negatives. Additionally, the rules can be generated using bytes-sequences instead of performing other, more computationally complex operations (e.g., string analysis, regex operations), which can permit for more efficient runtime rule performance and evaluation.

The disclosed technology can use a two-phase approach for performing these techniques. In the first phase, which can be considered a signature sequence discovery phase, byte sequences in malware files can be identified and attributed to a particular malware family. Bytes within those sequences can be wildcarded, and the resulting sequences can be stored in association with the particular malware family. The resulting byte sequences can be stored in or added to a dictionary for the particular malware family. The dictionary can include a count indicating how many malware files a particular sequence was identified in. The dictionary can sometimes be reduced down to only sequences that were identified in every file or at least a threshold quantity of files associated with the particular malware family. In the second phase, which can be considered a signature sequence deconfliction phase, the particular malware family's sequences can be searched for in the sequences that have been identified for other malware families. Finding a sequence in another family's sequences indicates that the particular sequence is not unique to the particular malware family. When the sequence is not unique to the particular malware family, the sequence can be removed from the particular malware family's dictionary of sequences. Criteria can also be used to determine whether to remove a sequence from the particular malware family's dictionary, such as a percentage of malware families containing the sequence that also appeared in the sequences of other malware families. Like malware families, which can include families based off of the same parent family, may skip the second phase of deconfliction since deconflicting like families has the chance of disrupting sequences for those families and thus disrupting generation of rules that accurately detect those malware families. The rules described herein can be YARA rules, although the disclosed technology may also apply to other types of malware detection rules.

As an illustrative example of the disclosed technology, all 5-byte sequences for a particular malware family can be identified during the first phase. These sequences can be added to a dictionary for the particular malware family. Also during the first phase, wildcard bytes (e.g., 3-byte wildcard atoms, other predetermined wildcard sequence size(s)) can be injected at various positions in the sequences in the dictionary, and threshold-byte static byte atoms can be preserved. During the second phase, a deconfliction process can be performed in which all of the sequences in the dictionary, including the sequences with wildcards, are checked against sequences that have been identified for other malware families. Sequences in the dictionary for the particular malware family that match sequences known for other malware families can be removed from the dictionary. Doing so can provide for generating a curated, final set of unique byte sequences for the particular malware family. This curated, final set can be added to another dictionary, in some implementations. The curated, final set can be used to update and/or generate robust, specific, and accurate malware detection rules for the particular malware family, such as YARA rules.

One or more embodiments described herein can include a method for identifying unique byte sequences for malware families, the method including: receiving, by a computer system, a collection of malware signature samples, grouping, by the computer system, malware signature samples in the collection by malware family, and for each malware family: identifying, by the computer system, unique byte sequences in the malware signature samples and a number of instances of the unique byte sequences across the malware signature samples, adding, by the computer system, the identified unique byte sequences to a dictionary for the malware family, retrieving, by the computer system from a data store, a dictionary of at least another malware family, comparing, by the computer system, the unique byte sequences in the dictionary for the malware family with byte sequences in the dictionary of the at least another malware family, identifying, by the computer system, a conflicting byte sequence based on (i) the comparison and (ii) determining that a number of instances of the conflicting byte sequence across the malware signature samples in the malware family is more than a threshold number of instances, removing, by the computer system, the identified conflicting byte sequence from the dictionary for the malware family, and returning, by the computer system, the dictionary for the malware family.

In some implementations, the embodiments described herein can optionally include one or more of the following features. For example, the method can include updating, by the computer system, at least one of the malware detection rules having the relationship with the malware family based on at least one byte sequence in the updated dictionary. The method can include incrementing, by the computer system, a count in response to adding each of the identified unique byte sequences to the dictionary for the malware family. The count can be the number of instances of the unique byte sequences across the malware signature samples. The count can be a quantity of unique byte sequences that were identified for the malware family.

The method can also include adding, by the computer system, a subset of the unique byte sequences from the dictionary to a final dictionary for the malware family, the subset of the unique byte sequences including unique byte sequences that were not removed from the dictionary based on matching the at least one byte sequence in the dictionary of the at least another malware family. In some implementations, returning, by the computer system, the updated dictionary for the malware family can include transmitting the updated dictionary to a user device of a user in the enterprise for presentation in a graphical user interface (GUI) display. As another example, returning, by the computer system, the updated dictionary for the malware family can include transmitting the updated dictionary to a malware rule system that can be configured to update the one or more malware detection rules based on the updated dictionary and execute the one or more malware detection rules in runtime to monitor files attempting to enter the internal network of the enterprise.

As another example, for each malware family, identifying, by the computer system, unique byte sequences in the malware signature samples to add to a dictionary for the malware family can include: for each malware signature sample for the malware family, reading a threshold quantity of bytes of a byte sequence of the sample, adding the read threshold quantity of bytes into the dictionary for the malware family, reading a next set of the threshold quantity of bytes of the byte sequence of the family, and adding the read next set of the threshold quantity of bytes of the byte sequence into the dictionary for the malware family. The threshold quantity of bytes can be 5 bytes.

In some implementations, responsive to adding, by the computer system, the identified unique byte sequences to the dictionary for the malware family, the method further can include: selecting a sequence amongst the identified unique byte sequences in the dictionary for the malware family, identifying a byte position in the selected sequence that allows for a threshold-byte-atom to exist in the selected sequence, and responsive to determining that the byte position allows for the threshold-byte-atom to exist, injecting a wildcard byte at the byte position in the selected sequence. The threshold-byte-atom can be a 3-byte-atom. Injecting the wildcard byte at the byte position in the selected sequence can include generating a new sequence that includes the injected wildcard bytes at the byte position in the selected sequence and bytes at other byte positions in the selected sequence.

As another example, the threshold number of instances can be a percentage value of 20%. For each malware family, identifying, by the computer system, unique byte sequences in the malware signature samples to add to a dictionary for the malware family can include adding the unique byte sequences that appear in a threshold quantity of the malware signature samples to the dictionary for the malware family. For each malware family, identifying, by the computer system, unique byte sequences in the malware signature samples to add to a dictionary for the malware family can include adding each unique byte sequence in each of the malware signature samples to the dictionary for the malware family. The method can also include detecting, by the computer system using a rule engine that is configured to load and execute malware detection rules that are generated using the dictionary for the malware family, malware instances in network traffic. Grouping, by the computer system, malware signature samples in the collection by malware family can also be based on common characteristics amongst the malware signature samples for the family.

One or more embodiments described herein can include a system for identifying unique byte sequences for malware families, the system including: a computer system that can be configured to generate malware detection rules, a data store that can be configured to receive and store the malware detection rules generated by the computer system, and a rule engine that can be configured to retrieve the malware detection rules from the data store and detect, using the retrieved malware detection rules, malware instances in network files. The computer system can include processors and memory and can be configured to perform operations including: receiving a collection of malware signature samples, grouping malware signature samples in the collection by malware family, and for each malware family: identifying unique byte sequences in the malware signature samples and a number of instances of the unique byte sequences across the malware signature samples, adding the identified unique byte sequences to a dictionary for the malware family, retrieving, from the data store, a dictionary of at least another malware family, comparing the unique byte sequences in the dictionary for the malware family with byte sequences in the dictionary of the at least another malware family, identifying a conflicting byte sequence based on (i) the comparison and (ii) determining that a number of instances of the conflicting byte sequence across the malware signature samples in the malware family is more than a threshold number of instances, removing the identified conflicting byte sequence from the dictionary for the malware family, and returning the dictionary for the malware family.

The system can optionally include one or more of the abovementioned features and/or the following features. As another example, the computer system can be configured to perform operations further including: generating, using the returned dictionary for the malware family, one or more malware detection rules for the malware family, and transmitting the one or more malware detection rules for the malware family to the rule engine for execution and detection of instances of the malware family in the network files.

The devices, system, and techniques described herein may provide one or more of the following advantages. For example, the disclosed technology may reduce false positives during malware detection rule generation, which can result in more accurate rules that are capable of detecting variations in specific malware families. As an example, unlike traditional YARA rule generation that focuses on malware in x86 code, the disclosed technology accounts for higher-level interpretative languages, such as C #, to be able to capture many different malware families and variations in those malware families and then generate more accurate YARA rules. By analyzing malware files in various different constraints and/or languages, the disclosed technology provides comprehensive rule generation such that the resulting rules can accurately identify different types of malware families and malware families that may go unnoticed with some traditional YARA rules.

Moreover, the disclosed technology leverages both wildcards and a deconfliction process to prevent false positives and generate accurate rules for detecting, handling, and/or responding to network traffic that contains files associated with various malware families. Both wildcarding and deconflicting sequences associated with malware families can result in increased quality of known sequences per malware family and lower false positive malware detection rates during runtime use of the malware detection rules.

Byte-sequence-based rule generation and execution is also beneficially more efficient for use by a rule engine than other rule generation and execution techniques. Traditionally examining long sequences of strings can be a time-consuming and computationally intensive process. The disclosed technology provides lightweight techniques for quickly checking whether particular small byte sequences exist or not in network files and malware file instances, thereby utilizing less compute resources and requiring less processing power during rule generation as well as runtime execution of such rule(s).

As another example, the disclosed technology reduces an amount of time that analysts typically may spend to analyze malware families, identify unique sequences in those families, and subsequently generate family-specific malware detection rules. Similarly, the disclosed technology allows an analyst to manage large quantities of malware detection rules for large quantities of malware families. The disclosed technology also provides for automatically and routinely, or continuously, identifying new unique sequences for malware families and variants of those sequences (e.g., such as by wildcarding known sequences for the malware families). A running count and log of sequences associated with each malware family can be maintained and continuously updated, which consequently results in efficiently updating and generating malware detection rules. The resulting malware detection rules can more accurately identify and respond to variants of malware families as they are generated and/or released into networks, thereby providing improved security and protection for systems, devices, and networks of enterprises, organizations, and other entities.

The details of one or more implementations are set forth in the accompanying drawings and the description below. Other features and advantages will be apparent from the description and drawings, and from the claims.

BRIEF DESCRIPTION OF THE DRAWINGS

FIG. 2A is a conceptual diagram for building a dictionary of signature sequences unique to a particular malware family.

Like reference symbols in the various drawings indicate like elements.

DETAILED DESCRIPTION OF ILLUSTRATIVE EMBODIMENTS

This document generally relates to technology for identifying byte sequences unique to particular malware families and generating robust malware detection rules based on the identified byte sequences for each malware family. The disclosed technology can identify collections of hexadecimal sequences that exist for every file or signature in a particular malware family. Byte sequences that are unique to every file in that family can be identified during a first phase and maintained in a dictionary with a count indicating a quantity of files having each of the unique byte sequences. Also during the first phase, wildcard hexadecimal sequences can be injected into various positions in the sequences that have been identified for the particular malware family in order to introduce unique variants into the dictionary for the particular malware family. In a second, deconfliction phase, the identified sequences and the wildcarded sequences in the dictionary can be checked against unique byte sequences that have been identified for other malware families. Conflicting sequences can be eliminated from the dictionary for the particular malware family to reduce false positives. A conflict percentage, such as 20% of samples in a family, may also be used to preserve valid sequences for the particular malware family while still allowing deconfliction of other sequences with other families.

After the second phase, the resulting dictionary can be used to generate and/or update malware detection rules for the particular malware family. The rules can include, but are not limited to, YARA rules. YARA rules, for example, can define a number of conditions or variables that contain patterns in a sample of malware. If some or all of the conditions or variables are met, then depending on the particular rule, malware can be detected and/or identified in network traffic or other files before the network traffic/files enters an internal network, such as a network of computing devices in an enterprise's internal infrastructure. The disclosed technology can therefore be used to generate and/or update malware detection rules that can then be used to more accurately catch or identify malware before it enters the internal network of the enterprise.

Figure 1:
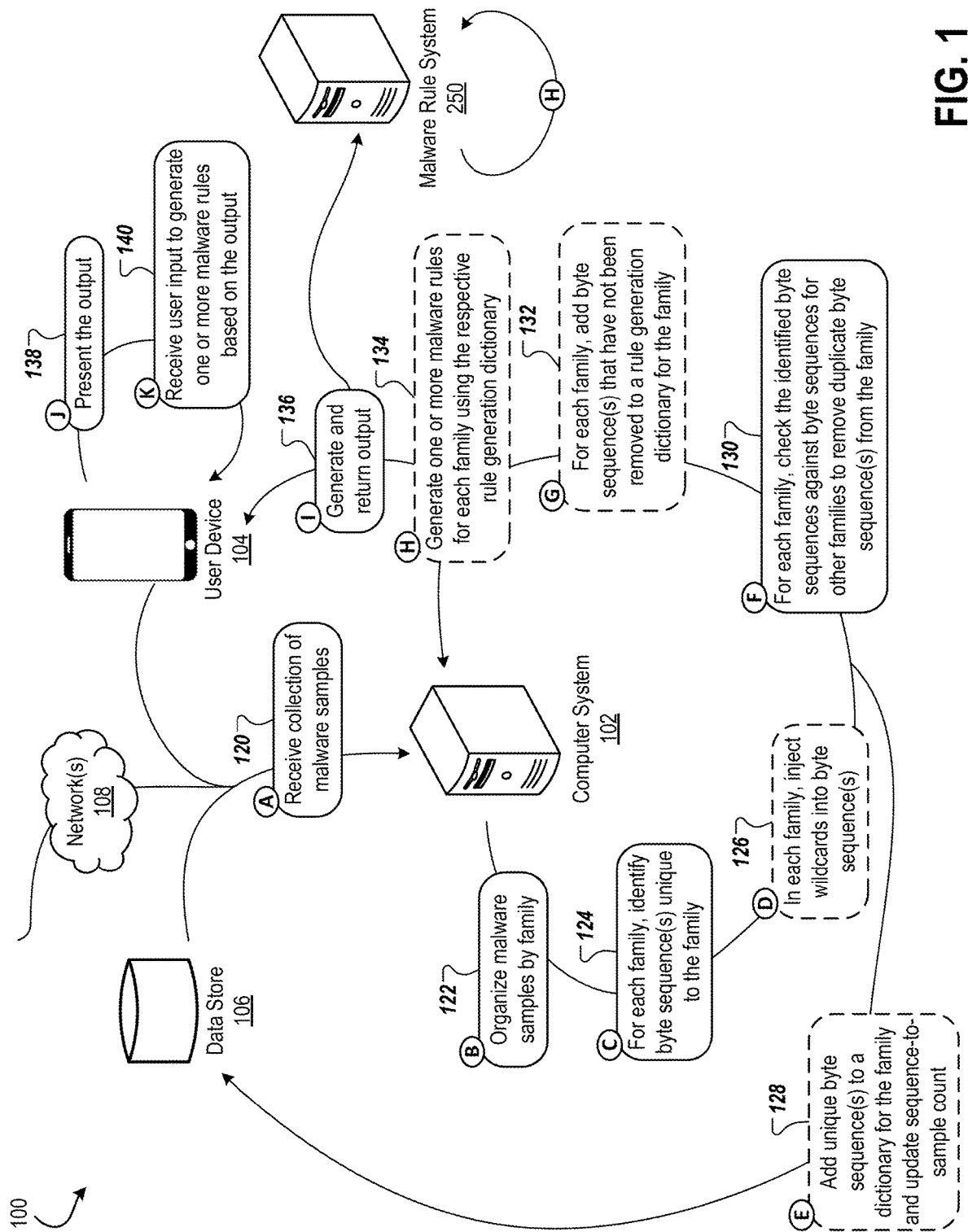
FIG. 1 is a conceptual diagram of a system for identifying signature sequences of particular malware families and generating family-specific malware detection rules using the respective signature sequences.

Referring to the figures, FIG. 1 is a conceptual diagram of a system 100 for identifying signature sequences of particular malware families and generating family-specific malware detection rules using the respective signature sequences. A computer system 102, user device 104, data store 106, and malware rule system 250 can communicate (e.g., wired and/or wirelessly) via network(s) 108. The network(s) 108 can be internal to an enterprise's infrastructure, such as an internal network of computing systems and devices associated with the enterprise. The network(s) 108 can additionally or alternatively be external to the enterprise's infrastructure and can also include communication with other components, systems, devices, and/or networks that may not be part of the enterprise's infrastructure.

In brief, the computer system 102 can be configured to identify signature sequences that are unique to various malware families, generate dictionaries of unique sequences for the malware families, wildcard the sequences for each malware family, and compare the unique sequences as well as the wildcarded sequences of each malware family with sequences of other malware families to generate curated sets of signature sequences for the respective malware families. The computer system 102 can be any type of computing system, computing device, and/or network of computing systems or devices that can perform the techniques described herein. In some implementations, the computer system 102 can be internal to the enterprise's infrastructure. In other words, the computer system 102 can be part of the enterprise's internal network. In some implementations, the computer system 102 may be remote from the enterprise's internal network.

The user device 104 can be any type of computing device such as a computer, laptop, smartphone, mobile phone, tablet, and/or wearable device. The user device can be part of the enterprise's internal network or remote. The user device 104 can be used by a user associated with the enterprise, such as an analyst or other user who generates, manages, and/or updates malware detection rules. The user device 104 can also be used by any other user that is in charge of security for the enterprise's internal network.

The data store 106 can be any type of data storage, data library, database, and/or cloud-based storage configured to store dictionaries of signature sequences for malware families and malware detection rules. The data store 106 may also maintain other relevant information for the disclosed techniques and the enterprise as a whole. The data store 106 can be part of the computer system 102. The data store 106 can be part of the enterprise's internal network. Sometimes, the data store 106 can be remote from the enterprise's internal network.

Figure 2B:
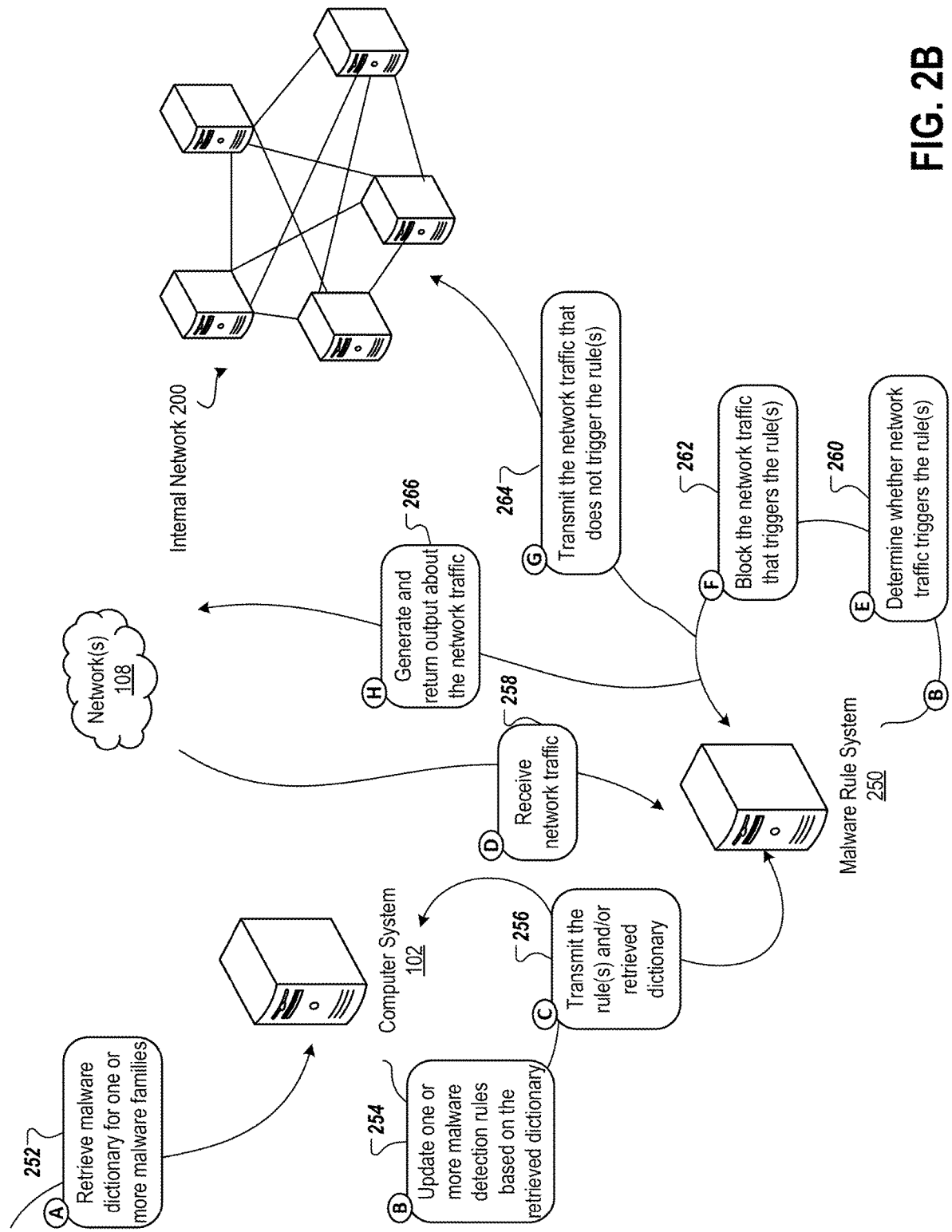
FIG. 2B is a conceptual diagram for generating family-specific malware detection rules using the dictionary of FIG. 2A and implementing the rules in runtime execution to detect malware attempting to infiltrate an enterprise's internal network.

The malware rule system 250 can be any type of computing system, device, and/or network of computers or devices that is configured to detect malware and other malicious files that attempt to infiltrate the enterprise's internal network. As shown in FIG. 2B, the malware rule system 250 can sit on an edge of the enterprise's internal network and monitor network traffic or other files before they enter the internal network. The malware rule system 250 can implement one or more malware detection rules described herein to detect and stop malware before it infiltrates the internal network. Sometimes, the malware rule system 250 can be part of the computer system 102. As shown in FIG. 1, the malware rule system 250 can also be separate from the computer system 102.

Still referring to FIG. 1, the computer system 102 can receive a collection of malware file samples in block A (120). The malware file samples can be received from the data store 106, the user device 104, and/or the network(s) 108. For example, the samples can be previously identified by the computer system 102 and/or the malware rule system 250 then stored in the data store 106. One or more of the samples can be synthetic and thus generated by the computer system 102 and/or the malware rule system 250. One or more of the samples can be identified, generated, and/or selected by a user at the user device 104, then transmitted to the computer system in block A (120).

The computer system 102 can organize the malware file samples by family in block B (122). For example, samples that have common characteristics or characteristics that are known for particular malware families can be grouped together/bucketized. In some implementations, the computer system 102 checks that every sample in a particular malware family is of a main bot for that family. Sometimes, a human analyst can check the samples to determine whether they are part of the main bot for that family.

For each malware family, the computer system 102 can identify byte sequences in signatures of the samples that are unique to the family (block C, 124). The identified byte sequences can be added to a dictionary for the family. Refer to the process 400 in FIG. 4 for further discussion about identifying the unique byte sequences for each malware family. Sometimes, blocks B and C (122 and 124, respectively) can be performed as one step.

Optionally, in each malware family, the computer system 102 can inject wildcards into one or more of the byte sequences that had been identified for the family in block C, 124 (block D, 126). Refer to the process 600 in FIG. 6 for further discussion about wildcarding the unique byte sequences for each malware family.

The computer system 102 can optionally add the unique byte sequences to a dictionary for the respective malware family in block E (128). Optionally, the computer system 102 may also update a sequence-to-sample count in the dictionary. The sequence-to-sample count can indicate how many malware file samples in the malware family contain each unique byte sequence that was identified for the family. Sometimes, the count may additionally or alternatively indicate how many samples are identified for the family and/or how many unique byte sequences are identified for the family. The count can be continuously updated, such as whenever new byte sequences are identified for the family and/or new malware file samples are identified as having one or more of the unique byte sequences associated with the family. The dictionary and the associated count can be stored in the data store 106.

Block E (128) can be performed before, during, or after one or more other blocks. Block E (128) can also be performed multiple times. For example, block E (128) can be performed after identifying the unique byte sequences for a malware family (block C, 124) and before injecting wildcards into those sequences (block D, 126). Block E (128) can be performed again after injecting the wildcards. As another example, block E (128) can be performed after organizing the malware samples by family (block B, 122), after identifying the unique byte sequences for a particular malware family (block C, 124), and/or after injecting the wildcards into the sequences for the particular malware family (block D, 126). Block E (128) can also be performed before, during, or after any of the blocks described further below, such as blocks F-K (130-140).

Still referring to FIG. 1, for each malware family, the computer system 102 can check the identified byte sequences (including the wildcarded sequences) against byte sequences for other malware families (block F, 130). The computer system 102 can then remove any conflicting byte sequences from the malware family. The computer system 102 can utilize a conflict percentage (which can be predetermined by the computer system 102 and/or set by the user at the user device 104) to determine which conflicting byte sequences to keep for the particular malware family and which conflicting byte sequences to remove for that malware family. Block F, 130, can be performed as part of a deconfliction process described throughout this disclosure. Removing the conflicting byte sequences can include removing such sequences from the dictionary associated with the malware family. Removing the conflicting byte sequences may additionally or alternatively include updating the sequence-to-sample count (e.g., lowering the count by a quantity of byte sequences that were removed from the dictionary). Refer to the process 500 in FIG. 5 for further discussion about deconflicting a particular malware family with other malware families.

The computer system 102 may optionally add byte sequences that have not been removed for the particular malware family into a rule generation dictionary for that family (block G, 132). The rule generation dictionary can therefore contain a curated, final set of unique byte sequences (including wildcarded sequences) that are associated with the particular malware family. The rule generation dictionary can be different than the dictionary described in reference to block E (128). The rule generation dictionary can be used by the computer system 102 and/or the malware rule system 250 to generate and/or update rules that are used to detect malware associated with the particular malware family. In some implementations, instead of generating the rule generation dictionary, the computer system 102 may simply remove the conflicting byte sequences from the dictionary of block E (128) and use that dictionary to generate and/or update the rules.

In block H (134), the computer system 102 can optionally generate or update one or more malware detection rules for the particular malware family using the respective rule generation dictionary. Sometimes, block H (134) can be additionally or alternatively performed by the malware rule system 250.

The computer system 102 can generate and return output in block I (136). The output can include the dictionary of block E (128) and/or the rule generation dictionary of block G (132). The output can include the sequence-to-sample count and/or other metrics or information that can be useful to the user of the user device 104 in diagnosing the security and malware detection techniques employed in the system 100. The output can include information about one or more of the unique byte sequences for the particular malware family or one or more other malware families. Sometimes, the output can include one or more of the malware detection rules (such as old malware detection rules, updated malware detection rules, and/or newly generated malware detection rules) for the particular malware family or other malware families.

The output can also be transmitted to the malware rule system 250 (block I, 136). The malware rule system 250 can use the output to generate or update one or more of the malware rules for one or more of the malware families (block H, 134).

The user device 104 can present the output in a graphical user interface (GUI) display (block J, 138). For example, the output can be presented in a user-facing interface, mobile application, or other software program.

The user device 104 can receive user input to generate one or more malware rules based on the output (block K, 140). For example, the user can update or generate malware detection rules using the unique byte sequences (and wildcarded sequences) that are part of the dictionary for a particular malware family. The user can also provide instructions indicating that one or more malware detection rules should be updated and/or generated according to the output. These instructions can be provided back to the computer system 102 and/or the malware rule system 250 and used by the system 102 and/or 250 to update or generate the rules.

As described herein, the computer system 102 can identify byte sequences unique to each family in a first phase, deconflict those sequences with sequences of other families in a second phase, and then generate malware detection rules using the sequences for the family that have not been deconflicted. The first phase, for example, can include blocks B-D (122, 124, and 126) in FIG. 1 and the second phase can include blocks F-G (130, 132).

FIG. 2A is a conceptual diagram for building a dictionary of signature sequences unique to a particular malware family. The computer system 102 can receive a collection of malware file samples 202 in block A (210). Refer to block A (120) in FIG. 1 for further discussion. The malware file samples 202 can be received in network traffic as part of network files, such as in the network(s) 108 described in FIG. 1. The malware file samples 202 can include signature byte sequences. The samples 202 may or may not be associated with particular malware families at the time they are received at the computer system 102. As shown in FIG. 2A, the samples 202 can include any quantity of signatures made up of hexadecimal sequences. The signatures may also be composed of one or more other types of byte sequences, values, and/or strings. The computer system 102 can receive malware samples and non-malware samples. Non-malware samples can be assessed and processed similarly to malware samples. For example, including non-malware samples in a deconfliction phase described herein can reduce false positives of the malware samples.

In block B (212), the computer system 102 can identify and annotate samples in the collection of samples 202 that have sequences known for one or more malware families. For example, the computer system 102 can apply one or more rules to determine whether any of the samples 202 match known sequences (or have a threshold quantity of known sequences) for one or more malware families. The computer system 102 can also apply one or more other techniques and/or rules to identify characteristics in the samples 202 that are common characteristics for one or more malware families.

In the example of FIG. 2A, the computer system 102 identified that signatures $s0 and $s4 contain sequences that are known for malware family A. The signatures $s0 and $s4 have been annotated with a label for malware family A. The computer system 102 also identified that signatures $s2 and $s3 contain sequences that are known for malware family N. The signatures $s2 and $s3 may not have to be in binary near each other in a particular file or malware sample. The signatures $s2 and $s3 have been annotated with a label for malware family N.

In some implementations, the signatures $s0, $s2, $s3, and $s4 can be byte sequences that are extracted from the signatures received in the samples 202. As described further in the process 400 of FIG. 4, the computer system 102 can read each sample 202 and identify N-byte sequences therein, where N can be an arbitrary number. As an illustrative example, the N-byte sequences can be 5-byte sequences. The 5-byte sequences that are identified can then be extracted and identified as $s0, $s2, $s3, and/or $s4. As an illustrative example, $s0 and $s4 can be 5-byte sequences extracted from the same malware signature sample, that signature sample being associated with the malware family A. Other variations and implementations are also possible.

Still referring to FIG. 2A, the computer system 102 can add the annotated samples to dictionaries that correspond to the respective malware families (block D, 216). Here, the signatures $s0 and $s4 have been added to dictionary 206A for family A malware samples. The dictionary 206A also contains one or more other signatures associated with the malware family A, including but not limited to signatures $s25 and $s29. The signatures $s2 and $s3 have been added to dictionary 206N for Family N malware samples. The dictionary 206N also contains other signatures associated with the malware family N, including but not limited to signatures $s8 and $s9.

In block E (218), the computer system 102 can wildcard one or more positions in the signature sequences in each of the family dictionaries. The computer system 102 can inject wildcard sequences into all of the signatures in each dictionary. Sometimes, the computer system 102 may inject wildcard sequences into only some of the signatures in each dictionary. For example, the computer system 102 may inject wildcard sequences into the new signatures that are added to the dictionary in block D (216). As another example, the computer system 102 may inject wildcard sequences into a random subset of the signatures that are in the dictionary, which may or may not include new signatures and older signatures. As described further in reference to FIG. 6, the computer system 102 may wildcard only some sequence positions in the signatures that would allow for N-byte atoms to exist in the signature. For example, in a signature having five sequence positions, the computer system 102 can inject a wildcard byte sequence at the second or fourth positions in the signature. Wildcard sequences can also be injected into the signatures using other rules and/or criteria. Sometimes, wildcards can be added during a deconfliction phase described further herein.

As shown in FIG. 2A, the computer system 102 updates the dictionary 206A' for malware family A by injecting wildcard sequences into at least the signatures $s0 and $s4. Although not shown, the computer system 102 may also inject wildcard sequences or bytes into one or more other sequences in the dictionary 206A', such as $s25 and/or $s29. The computer system 102 injected a wildcard byte of "??" in the second position in the signature $s0 to generate signature $s0'. The computer system 102 injected a wildcard byte of "??" in the fourth position in the signature $s4 to generate signature $s4'.

As shown in FIG. 2A, the computer system 102 updates the dictionary 206N' for malware family N by injecting wildcard byte sequences into one or more of the signatures. Although not shown, the computer system 102 may also inject wildcard bytes into one or more other sequences in the dictionary 206N'.

The computer system 102 can then deconflict the signatures in one family dictionary with other family dictionaries in order to generate a curated, final set of signature sequences for the one family (block F, 220). Sometimes, the computer system 102 can remove signatures from the one family dictionary that have a threshold quantity of matching sequences with signatures in the other family dictionaries. Sometimes, the computer system 102 may not remove the signatures from the one family dictionary if a threshold quantity of signatures in that dictionary contain one or more particular sequences, even if the particular sequences appear in signatures of other family dictionaries. As an illustrative example, if a signature in the one family dictionary contains a particular sequence that also appears in less than 20% of samples from another families dictionary, then the signatures containing the particular sequence may remain in the one family dictionary. After all, the signatures containing the particular sequence may in fact be unique to the family associated with that dictionary.

Here, for example, the computer system 102 compared the signature sequences in the dictionary 206A' for malware family A to the signature sequences in the dictionary 206N' for malware family N. The computer system 102 identified one instance of the signature $s4 in the dictionary 206A' that matches the signature $s9 in the dictionary 206N' for the malware family N. As a result, the computer system 102 may remove the signature $s4 from the dictionary 206A' for the malware family A. In this case, the signature $s4 contains all the same sequences as the signature $s9. In some implementations, the signature $s4 may contain some sequences that are different than the sequences in the signature $s9. However, the signature $s4 may still be removed from the family A dictionary 206A' because only one or less than a threshold quantity of signatures in the dictionary 206A' contain the particular sequence that appears in the signature $s9 for the malware family N. On the other hand, if the signature $s4 and at least the threshold quantity of other signatures in the dictionary 206A' contain at least one of the same sequences that appear in the signature $s9 for the malware family N, then the signature $s4 and the threshold quantity of other signatures are not removed from the dictionary 206A'. The presence of the sequence(s) in these signatures can be indicative of a common characteristic for the malware family A.

For each family, the computer system 102 can return the deconflicted dictionary (block G, 222). Returning the deconflicted dictionary can include storing the dictionary in a data store, such as the data store 106. Returning the deconflicted dictionary can also include transmitting the dictionary to the malware rule system 250, as described further in reference to FIG. 2B. Returning the deconflicted dictionary can also include using the dictionary to update and/or generate one or more malware detection rules for the corresponding malware families.

FIG. 2B is a conceptual diagram for generating family-specific malware detection rules using the dictionary of FIG. 2A and implementing the rules in runtime execution to detect malware attempting to infiltrate an enterprise's internal network 200. The rules described herein can be implemented in order to quickly identify potential malware in network traffic or other types of files before the network traffic or files enter the internal network 200 of the enterprise.

As shown in FIG. 2B, the computer system 102 can retrieve a malware dictionary for one or more malware families (block A, 252). For example, the computer system 102 can retrieve the dictionaries 206A' and 206N' for the malware families A and N, respectively.

Using the retrieved dictionary, the computer system 102 can update one or more malware detection rules for the malware family that corresponds to the retrieved dictionary (block B, 254). In some implementations, the retrieved dictionary can be transmitted to the malware rule system 250 (block C, 256) and then the malware rule system 250 can update one or more of the malware detection rules (block B, 254). In some implementations, in addition to or instead of updating the rules by the computer system 102 and/or the malware rule system 250, one or more new malware detection rules can be determined using the signature sequences in the retrieved dictionary.

The rules can be YARA rules, as described herein. One or more other types of malware detection rules may also be updated and/or generated in block B (254). Each of the rules can define different triggering conditions. The rules can also define different actions to be taken (e.g., automatically by the malware rule system 250, manually by a relevant user in the internal network 250) in response to being triggered. Sometimes, updating existing rules can include adding one or more of the signatures or signature sequences from the retrieved dictionary to a trigger condition in the rules. For example, a rule for detecting malware in family A can be triggered if network traffic or another file contains signatures $s25 and/or $s29 shown in FIG. 2A. The computer system 102 and/or the malware rule system 250 can update this rule so that the rule is triggered if network traffic contains signatures $s25, $s29, $s0, $s0', and/or $s4', as shown in FIG. 2A. In some rules, all signature sequences may be required for the rule to be triggered. In some rules, a subset or minimum threshold quantity of signature sequences may be required for the rule to be triggered. In yet some rules, at least one of the signature sequences may be required for the rule to be triggered. Various other implementations of the rules are possible. The rule can also be updated so that the rule is triggered if one or more sequences of the signatures in the retrieved dictionary are identified in network traffic. Various other updates can also be made to the rules so that the rules efficiently and accurately identify malware and variations of malware that may attempt to infiltrate the internal network 200 via the network(s) 108.

The updated and/or generated rule(s) can be transmitted from the computer system 102 to the malware rule system 250 in block C (256). In some implementations in which the rules are updated and/or generated at the malware rule system 250, block C (256) may not be performed. Rather, the malware rule system 250 can retrieve the rules from the data store 106 described in FIG. 1, update the retrieved rules, and/or execute the rules during runtime execution.

The malware rule system 250 can also receive network traffic or other types of files in block D (258). the network traffic can be received from the network(s) 108. The network traffic can include files of information, data, and/or files that are being routed to the internal network 200 of the enterprise. Before the network traffic can enter the internal network 200, the network traffic can pass through a security wall, which can be the malware rule system 250.

The malware rule system 250 can determine whether any content in the network traffic triggers one or more of the malware detection rules (including previously defined rules, newly generated rules, and/or updated rules) (block E, 260).

The malware rule system 250 can block any of the network traffic that triggers one or more of the malware detection rules (block F, 262). The system 250 may not let that network traffic be transmitted into the internal network 200. The system 250 may also perform one or more other actions responsive to blocking the network traffic. The other actions can be defined by the rule(s) that is triggered.

The malware rule system 250 can also transmit any of the network traffic that does not trigger one or more of the malware detection rules to the internal network 200 (or more particularly, a system or device in the internal network 200 that the transmitted network traffic is intended to be received by) (block G, 264).

The malware rule system 250 can generate and return output about the assessed network traffic in block H (266). The output can be returned to the computer system 102, the data store 106, the user device 104 in FIG. 1, or any other computing system and/or device in communication via the network(s) 108. The output can indicate how much or what network traffic was blocked in block F (262), what malware detection rules were triggered in block E (260), and/or how much or what network traffic did not trigger any of the rules in block G (264). The output may also indicate one or more responses that the malware detection system 250 took when the network traffic triggered one or more rules in block E (260). In some implementations, the output can indicate one or more particular signatures, signature sequences, and/or malware families that were detected and that triggered one or more of the malware detection rules in block E (260). Various other metrics, data, and information about rule triggering process in blocks E-G (260-264) can also be returned in the output.

Although the disclosed techniques are described with reference to network traffic, the disclosed techniques can also apply to any other type of file.

Figure 3:
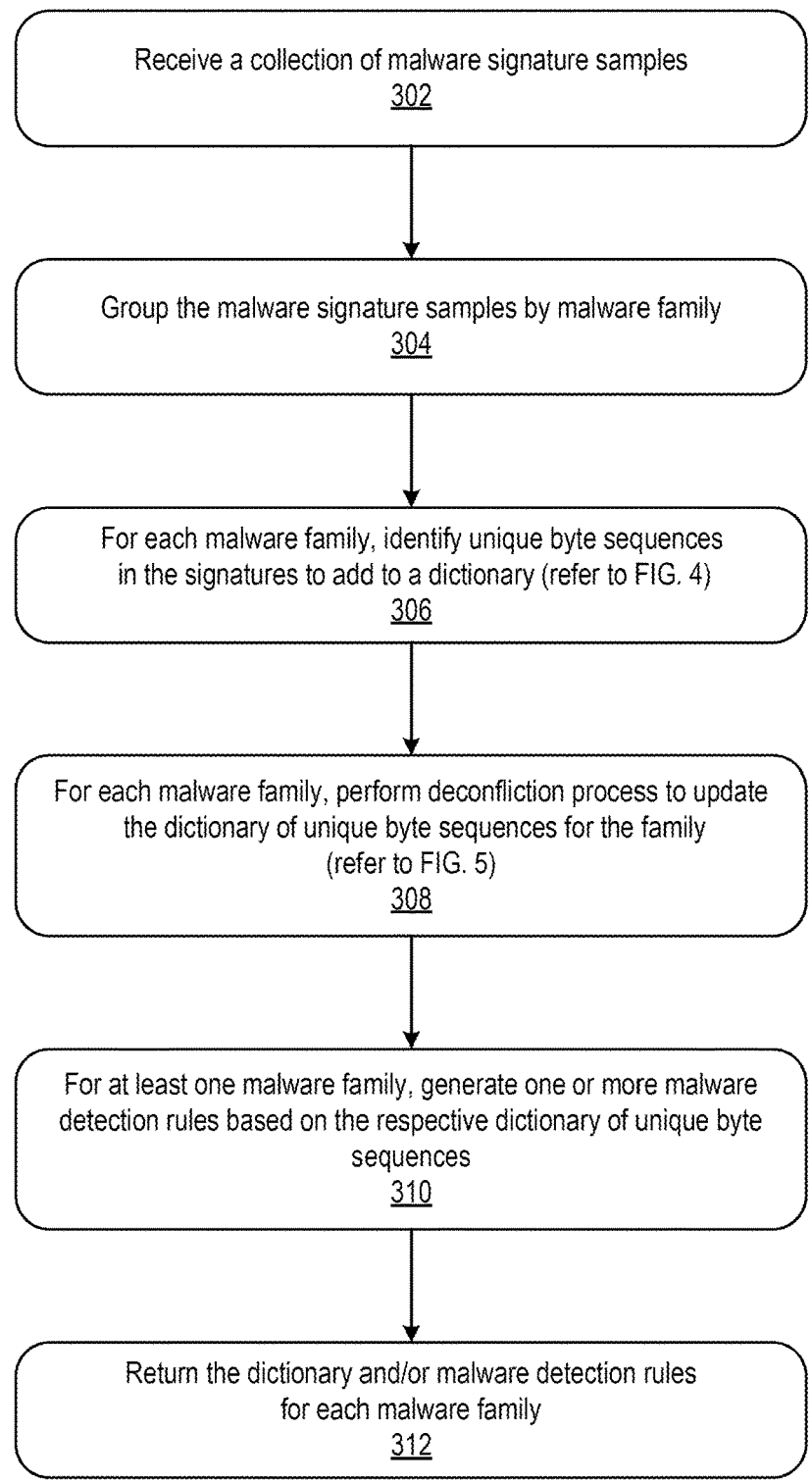
FIG. 3 is a flowchart of a process for identifying signature sequences unique to malware families and generating family-specific malware detection rules using the identified signature sequences.

FIG. 3 is a flowchart of a process 300 for identifying signature sequences unique to malware families and generating family-specific malware detection rules using the identified signature sequences. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3, the computer system can receive a collection of malware signature samples in block 302. Refer to block A (120) in FIG. 1 for further discussion.

In block 304, the computer system can group the malware signature samples by malware family. Sometimes, block 304 can be performed as part of block 306, described below. Refer to block B (122) in FIG. 1 for further discussion.

Figure 4:
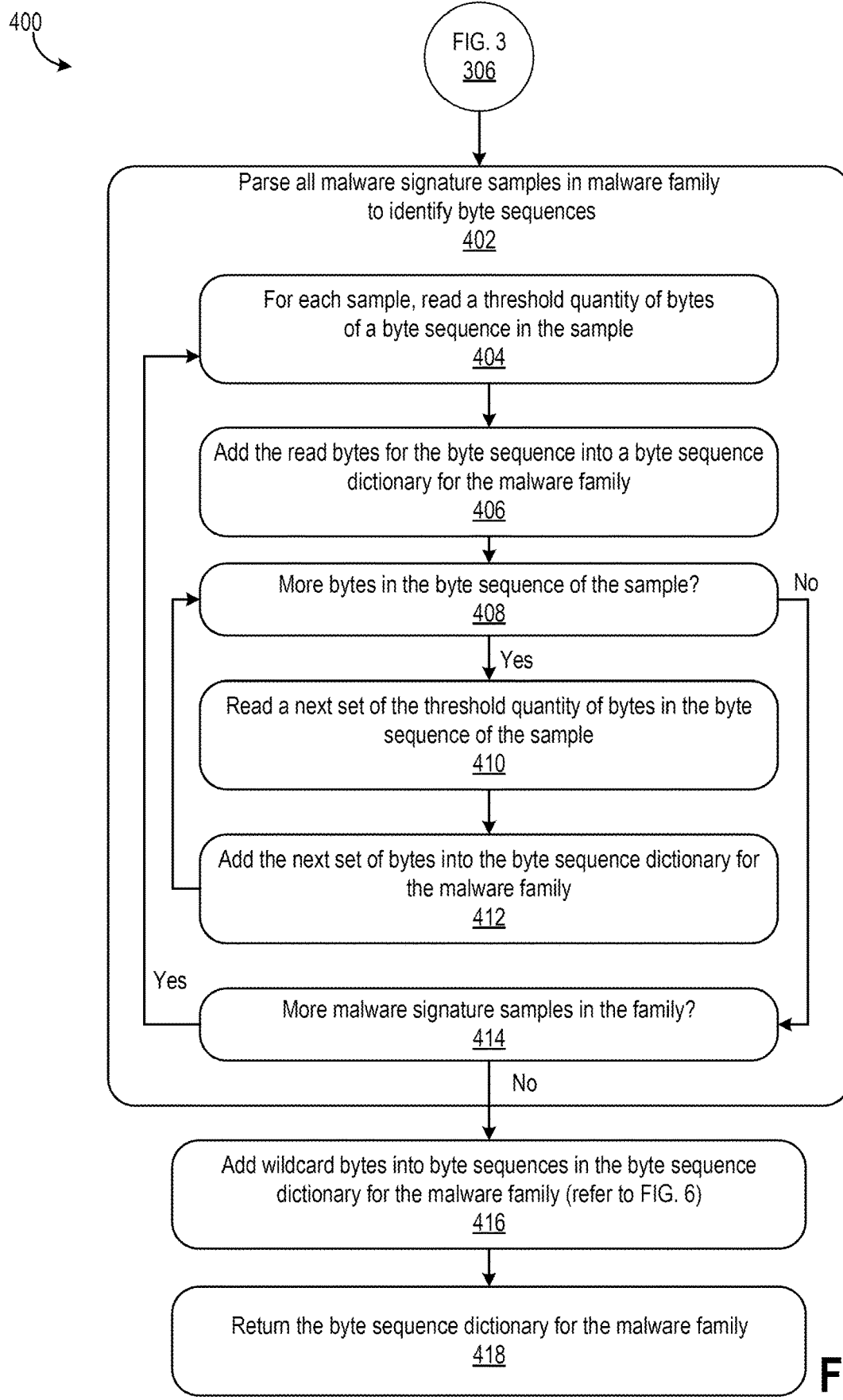
FIG. 4 is a flowchart of a process for identifying unique signature sequences for a particular malware family.

For each malware family, the computer system can identify unique byte sequences in the signatures that have been grouped for the malware family (block 306). Refer to FIG. 4 for further discussion about this first phase in the disclosed techniques. Identifying the unique byte sequences can include adding those sequences to a dictionary for the particular malware family. The computer system can go through all malware signature samples that are received in the collection in block 302 and parse out all of the samples to identify byte sequences.

The computer system can then analyze N-byte sequences at a time, then store them in the dictionary for the malware family. In some implementations, the sequence length can be longer than five bytes without negatively impacting performance of the disclosed techniques (e.g., time for the disclosed techniques to run may be affected by sequence length, but time that the signatures take to be analyzed by one or more malware detection rules may not be impacted by sequence length). The size of the dictionary can be reduced into hexadecimal sequences for every signature sample in the received collection of samples. The hexadecimal sequences may be unique to the particular malware family. Sometimes, if a unique sequence appears in just one family member, the sequence may be added to the dictionary. Sometimes, if a unique sequence appears in a threshold quantity of family members, then the sequence can be added to the dictionary. The computer system can also generate a count to keep tally of how many family members exist, how many unique byte sequences exist, and/or how many family members contain each unique byte sequence associated with the malware family. The count can be updated (e.g., incremented, decremented) whenever new byte sequences are identified and/or new family members are identified.

Figure 5:
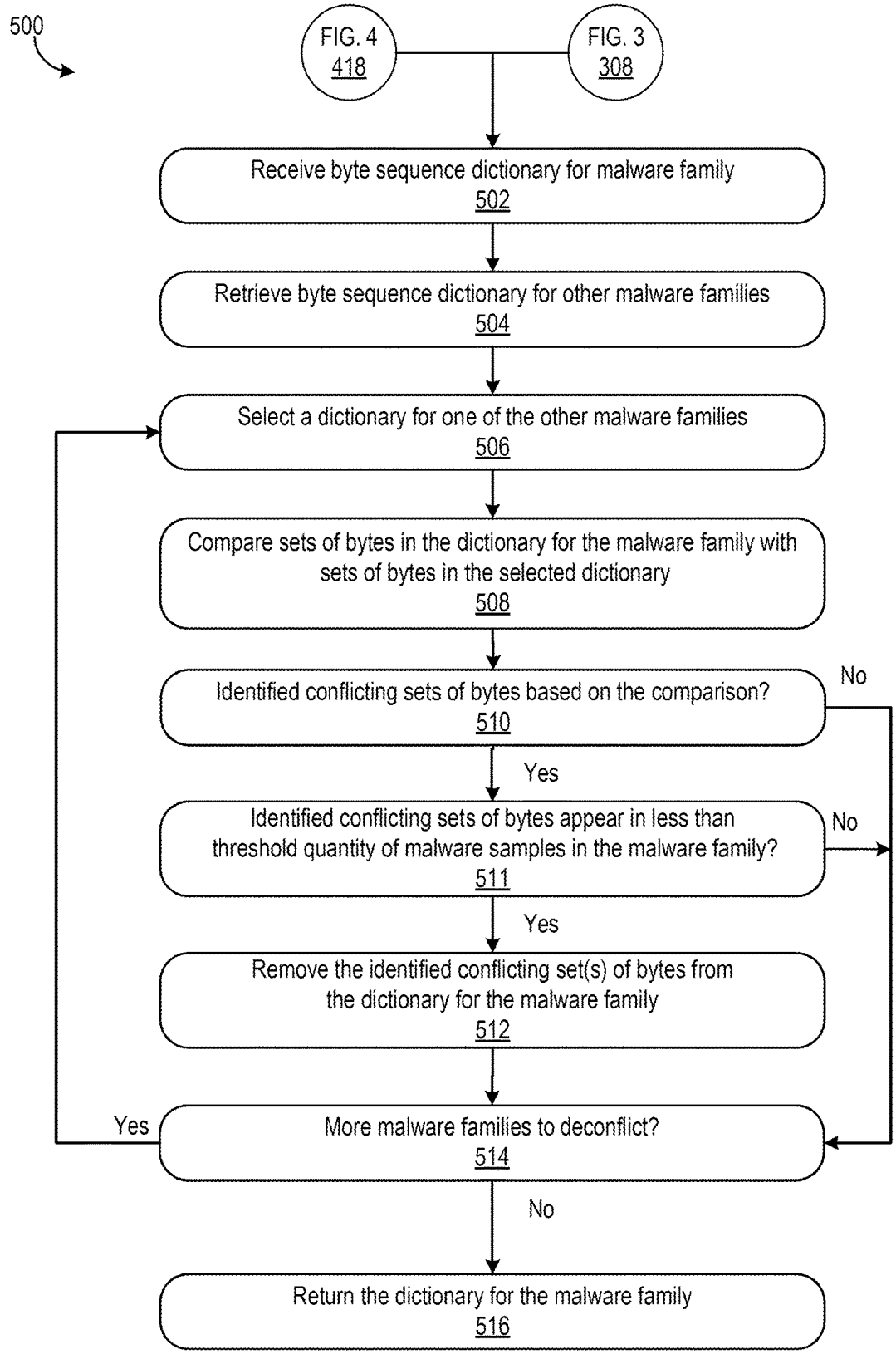
FIG. 5 is a flowchart of a process for deconflicting unique signature sequences for a particular malware family with signature sequences for other malware families.

In block 308, the computer system can, for each malware family, perform a deconfliction process to update the dictionary of unique byte sequences for the particular family. The computer system may remove one or more sequences from the dictionary that was created in block 306 as part of the deconfliction process. The deconfliction process can be performed in order to improve accuracy and efficiency of malware detection rules by reducing false positives during runtime execution of the rules. Sometimes, the computer system may generate a new dictionary that includes a curated, final subset of unique byte sequences from the sequences that were included in the dictionary of block 306. Refer to FIG. 5 for further discussion about this second phase in the disclosed technology. As described further in FIG. 5, the deconfliction process can include comparing the sequences in the dictionary for the particular family with signatures in dictionaries for other families. For example, the computer system can iterate through all sequences in the dictionary for the particular family. The computer system can go one sequence at a time in the dictionary and check it against all other sequences for all other families. If a particular sequence in the dictionary for the particular family matches another sequence in at least one other dictionary for the other families, then the computer system can remove the particular sequence from the dictionary for the particular family.

Sometimes, the computer system may only remove the particular sequence from the dictionary if the particular sequence appears in more than a threshold quantity of members of another family. As an illustrative example, if a sequence from a particular family appears in more than 20% of members of another family then the sequence may be removed from the dictionary. If a sequence from a particular family appears in less than 20% of members of another family then the sequence may remain in the family dictionary. The threshold quantity of members can be another percentage value such as 5%, 10%, 15% etc.

For at least one malware family, the computer system may generate one or more malware detection rules based on the respective dictionary of unique byte sequences (block 310). Sometimes, block 310 may not be performed. Sometimes block 310 may be performed by another system, such as the malware rule system 250 described throughout this disclosure.

In block 312, the computer system can return the dictionary and/or the malware detection rules for each malware family (or each malware family that was updated based on identification of new unique signature sequences for that family), as described throughout this disclosure.

FIG. 4 is a flowchart of a process 400 for identifying unique signature sequences for a particular malware family. The process 400 can be performed as a first phase in the disclosed techniques, as described throughout this disclosure. The process 400 is merely an illustrative example of identifying unique sequences for a particular malware family. Other techniques described throughout this disclosure may also be performed to identify the unique sequences for the particular family. The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the process 400 can be performed as part of block 306 in the process 300 of FIG. 3, in which the computer system identifies unique byte sequences in signatures to add to a dictionary corresponding to a particular malware family. The process 400 can also be performed as a process that is separate from one or more blocks in the process 300 in FIG. 3.

In block 402, the computer system can parse all malware signature samples in a particular malware family to identify byte sequences unique to that particular malware family. As described herein, the byte sequences can be hexadecimal sequences in the signature samples. The byte sequences can also be other types of sequences and/or strings in the signature samples. Blocks 404-414 can be performed as part of block 402. Sometimes, one or more of the blocks 404-414 may not be performed or can be performed separately from block 402.

In the example process 400 in FIG. 4, for each malware signature sample, the computer system can read a threshold quantity of bytes of a byte sequence in that sample (block 404). The threshold quantity of bytes can be 5 bytes. The threshold quantity of bytes can be a smaller or larger threshold quantity, which can be determined by a relevant user in an enterprise implementing the disclosed techniques. As non-limiting examples, the threshold quantity of bytes can be 3 bytes, 7 bytes, 8 bytes, 10 bytes, 15 bytes, 20 bytes, etc. Using a larger threshold quantity of bytes than 5 bytes can result in having fewer false positives when the disclosed techniques are executed in runtime. A threshold quantity of 5 bytes can be advantageous to increase speed and efficiency at which malware signature samples are analyzed when building the dictionary and/or when assessing network traffic with corresponding malware detection rules during runtime execution. The threshold quantity of 5 bytes may also have higher quality returns than threshold quantities of fewer bytes or more bytes.

The computer system can add the read bytes for the byte sequence into a byte sequence dictionary for the malware family (block 406). The computer system can keep tally or a count of how many malware signature samples contain the read bytes. The computer system can also keep tally or a count of how many byte sequences are read and added into the dictionary. The computer system can keep tally or a count of how many instances the read bytes appear in a particular malware signature sample. The computer system can keep tally or a count of how many total instances the read bytes appear in all the malware signature samples associated with the malware family. Sequences that have a tally equal to a number of samples in a family can be considered unique sequences for that family. As another example, a sequences tally divided by the number of samples in a set can represent a percentage of samples that the sequences appeared in, which can be used in a threshold comparison for deconfliction.

As an illustrative example of the process 400, the computer system can identify a first set of 5 bytes in the byte sequence of the malware signature sample (block 404). The computer system can add the identified first set of 5 bytes into the dictionary (block 406). The computer system can then read a second set of 5 bytes in the byte sequence of the malware signature sample and add the second set of 5 bytes into the dictionary. The computer system can repeat through these blocks until all bytes in the byte sequence of the malware signature sample have been analyzed and/or identified. In some implementations, the first and second sets of 5 bytes can be non-overlapping sets of bytes. In yet some implementations, the first and second sets of 5 bytes can include at least one overlapping byte. Sometimes, as described herein, the computer system can add the entire malware signature sample into the dictionary, regardless of the computer system performing block 404 and/or block 406 as described above. For example, the computer system may add the entire malware signature sample to the dictionary if the sample contains the threshold quantity of bytes. As another example, the computer system may add the entire sample to the dictionary if the sample contains only one byte sequence. That byte sequence may or may not contain the threshold quantity of bytes.

In some implementations, the computer system may add the read byte sequences into the dictionary for the malware family in block 406 only if the read byte sequences appear in all malware signature samples of the malware family. As another example, the computer system can add the read byte sequences into the dictionary if the read byte sequences appear in a threshold quantity of the malware signature samples of the malware family. The threshold quantity can vary and/or can be determined by the relevant user in the enterprise. The byte sequence that is identified in block 404 and then added to the dictionary in block 406 may appear in different positions in multiple malware signature samples. In other words, the byte sequence that is identified in block 404 can be added to the dictionary so long as it appears in some position in the sequences of other malware signature samples associated with the malware family. In yet some implementations, as shown in the process 400 in FIG. 4, the computer system can add all read byte sequences into the dictionary for the malware family, even if the read byte sequence appears in only one malware signature sample of the malware family.

In block 408, the computer system can determine whether there are more bytes to be read in the byte sequence of the sample. If there are no more bytes to be read, the computer system proceeds to block 414 described further below. If there are more bytes to be read, the computer system can proceed to block 410.

In block 410, the computer system can read a next set of the threshold quantity of bytes in the byte sequence of the sample. As mentioned above, the computer system can read the first set of 5 bytes in the byte sequence of the sample in block 404 and add the first set to the dictionary in block 406. Then, in block 410, the computer system can read the second set of 5 bytes in the byte sequence of the sample (where the first and second sets can have at least one overlapping byte or no overlapping bytes). The computer system then adds the next set of bytes into the byte sequence dictionary for the malware family in block 412.

The computer system can determine whether there are more bytes in the byte sequence of the sample in block 408. If there are no more bytes, the computer system proceeds to block 414. If there are more bytes to be read, the computer system proceeds to block 410 described above.

Referring now to block 414, once there are no more bytes in the byte sequence of the sample to be read, the computer system determines whether there are more malware signature samples in the malware family to be assessed. If there are more samples, the computer system returns to block 404 and repeats blocks 404-412 for each remaining sample in the family. If there are no more samples to be assessed, the computer system proceeds to block 416. In some implementations, the computer system can assess more than one malware signature sample at a same time. In other words, the computer system can compare a set (or all) of the malware signature samples in the malware family with each other to identify unique 5-byte sequences that appear in all the samples in the set or a threshold quantity of the samples in the set. The identified sequences can then be added to the dictionary. The computer system can also update the count described above in reference to block 406 when adding the identified sequences to the dictionary for the malware family.

In block 416, the computer system can add wildcard bytes into byte sequences in the byte sequence dictionary for the malware family. Refer to the process 600 in FIG. 6 for further discussion.

The computer system then returns the byte sequence dictionary for the malware family in block 418. Returning the dictionary can include storing the dictionary in a data store, for later retrieval and use in other processes described herein. Returning the dictionary can additionally or alternatively include using the dictionary for a next process, such as deconflicting the sequences in the dictionary with sequences in dictionaries of other malware families.

In some implementations, as described herein, the computer system can add an entire malware signature sample into the dictionary, rather than reading in threshold quantities of bytes in the byte sequence of each malware signature sample. Then, in block 416, the computer system can inject wildcard bytes in various positions in the malware signature samples in the dictionary.

Although the process 400 is described in reference to one malware family, the process 400 can also be performed to identify unique byte sequences for other malware families.

In some implementations, the process 400 can also be performed to generate a dictionary of non-malicious signature samples. For example, the computer system can receive all signature samples in network traffic for an enterprise's network. The computer system can identify byte sequences that are unique to malware families and also byte sequences that are benign or non-malicious. The benign or non-malicious byte sequences can be added to a non-malicious signatures dictionary. The non-malicious signatures dictionary can then be used to automatically check efficiency and accuracy of a malware rule system in identifying malicious network traffic. The non-malicious signatures dictionary can also be used to trace down false positives during runtime execution of malware detection rules. As a result, the malware detection rules and other disclosed techniques can be updated accordingly.

FIG. 5 is a flowchart of a process 500 for deconflicting unique signature sequences for a particular malware family with signature sequences for other malware families. The process 500 can be performed as a second phase (e.g., a deconfliction phase) in the disclosed techniques, as described throughout this disclosure. The process 500 is merely an illustrative example of deconflicting signature sequences for the malware family. Other techniques described throughout this disclosure may also be performed in the deconfliction phase.

The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500 in FIG. 5, the process 500 can be performed as part of block 418 in the process 400 of FIG. 4 and/or block 308 in the process 300 of FIG. 3. The process 500 can also be performed as a process that is separate from one or more blocks in the processes 300 and 400 in FIGS. 3 and 4.

In block 502, the computer system can receive a byte sequence dictionary for a particular malware family. The dictionary can be received in block 502 as part of returning the dictionary in block 418 of the process 400 in FIG. 4.

The computer system can retrieve byte sequence dictionaries for other malware families in block 504. These dictionaries can be retrieved from a data store described herein.

In block 506, the computer system can select a dictionary for one of the other malware families.

The computer system can then compare sets of bytes in the dictionary for the particular malware family with sets of bytes in the selected dictionary in block 508.

The computer system can determine whether it identified any conflicting sets of bytes based on the comparison (block 510). In other words, the computer system can determine whether any set of bytes in the dictionary for the particular malware family also appears in the selected dictionary for the other malware family. If the computer system did not identify conflicting sets, the computer system proceeds to block 514, discussed below. This means that the sets of bytes in the dictionary for the particular malware family are unique to the particular malware family. Therefore, those sets of bytes can remain in the dictionary and be used for further processing described herein, such as updated and/or generating malware detection rules for the particular malware family. If the computer system identified at least one conflicting set of bytes, the computer system proceeds to block 511.

In block 511, the computer system determines whether the identified at least one conflicting set of bytes appears in less than a threshold quantity of malware signature samples in the particular malware family. If the identified conflicting set appears in more than the threshold quantity of samples in the other family, the computer system proceeds to block 512. If the identified conflicting set appears in more than the threshold quantity of samples in the particular family, the computer system proceeds to block 514. The computer system can assess the tally or count determined in the process 400 to make this determination. After all, the tally or count can indicate how many samples in the particular malware family contain the unique set of bytes.

When deconflicting, the computer system can take a single sequence from a family's dictionary and check if that sequence is in 20% of samples from another family. If the sequence is in more than 20% of samples from the other family, the sequence may not be considered unique to this family. If the sequence is in less than 20% of samples from the other family, then the sequence like would still be mostly unique and make a good malware detection rule.

The threshold quantity in block 511 can be a conflict percentage. The conflict percentage can be determined by a relevant user associated with an enterprise's network. Sometimes, the conflict percentage can be 20%. Other non-limiting examples of the conflict percentage can include 2%, 10%, 25%, 30%, 50%, 75%, etc. As an illustrative example, the computer system can determine whether the identified conflicting set of bytes appears in more than 20% of all samples in a malware family A. If the set of bytes appears in more than 20% of the malware family A samples, then the set of bytes can be removed from the dictionary for the malware family A since the set of bytes appears in a dictionary for at least one other malware family. If the set of bytes appears in less than 20% of the malware family A samples, then the set of bytes remains in the dictionary for the malware family A since it is a unique byte sequence for that family, even if it also appears in dictionaries for other malware families. As yet another illustrative example, if malware family A has a set of bytes that also appears in malware family B but more than 20% of samples in malware family B contain the set of bytes, then the set of bytes can be removed from the dictionary for the malware family A. After all, this can indicate that the set of bytes also exists in the malware family B and therefore should be removed from the dictionary for the malware family A. As yet another example, the computer system can determine whether the set of bytes appears in at least 2% of all samples in the malware family A and thus remains in the dictionary for the malware family A, even if the set of bytes also appears in a dictionary for at least one other malware family.

In block 512, the computer system removes the identified conflicting set of bytes from the dictionary for the particular malware family. After all, the conflicting set of bytes may not be unique to the particular malware family and therefore can result in false positives during runtime execution of the disclosed techniques. During runtime execution, for example, if the set of bytes is identified in network traffic, a wrong malware detection rule can be triggered in response, thereby compromising security efforts to detect and/or respond to such network traffic. After block 512, the computer system then proceeds to block 514. In some implementations, the computer system can generate a new dictionary that contains only the sets of bytes that are not identified as conflictings for the particular malware family. Therefore, the byte sequence dictionary that is received in block 502 can be maintained in the data store, updated, and/or retrieved at future times for additional processing. Whenever new sequences are identified for the particular malware family, those sequences can be added to the byte sequence dictionary, which is then deconflicted in the process 500 described herein.

In block 514, since the computer system did not identify conflicting sets of bytes to remove from the dictionary for the particular malware family, the computer system determines whether there are more malware families to deconflict. In other words, the computer system determines whether there are other dictionaries for other malware families to compare to the dictionary for the particular malware family. If there are more malware families, the computer system proceeds to block 506 and repeats blocks 506-512 for each remaining malware family. If there are no more malware families, the computer system proceeds to block 516.

In block 516, the computer system returns the dictionary for the particular malware family. The dictionary can be returned by storing it in the data store described herein. The dictionary can also be returned by using the dictionary to update and/or generate malware detection rules for the particular malware family. The dictionary can also be returned by transmitting the dictionary to a malware rule system as described herein for use in updating and/or generating the malware detection rules for the particular malware family.

Figure 6:
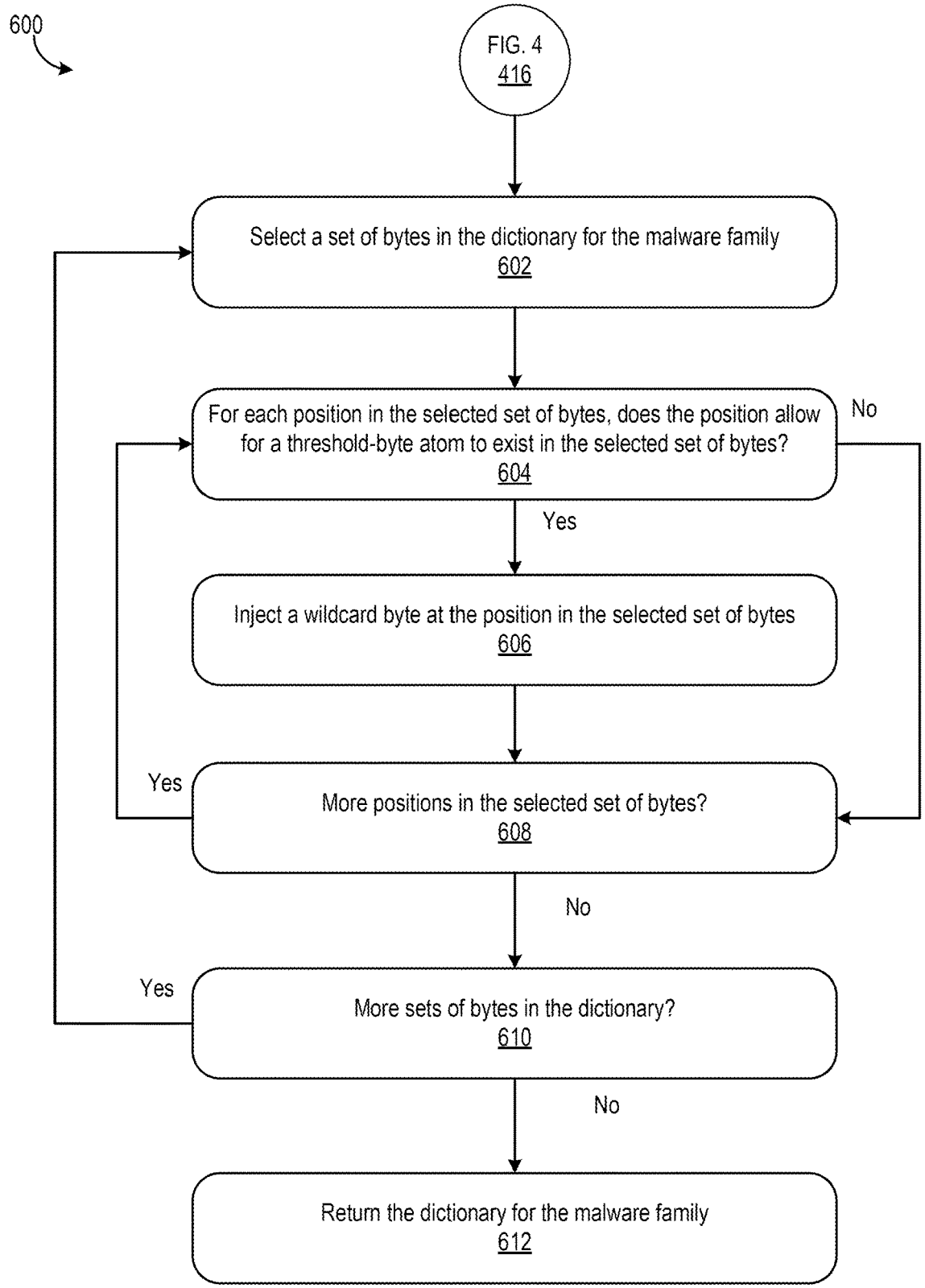
FIG. 6 is a flowchart of a process for injecting wildcard bytes into various positions in unique signature sequences for a particular malware family.

FIG. 6 is a flowchart of a process 600 for injecting wildcard bytes into various positions in unique signature sequences for a particular malware family. Wildcard bytes can be injected into unique signature sequences for families that have signature sequences likely to change whenever they are compiled.

The process 600 can be performed as part of the first phase in the disclosed techniques of identifying unique signature sequences of the particular malware family. The process 600 can be performed by the computer system 102. The process 600 can also be performed by one or more other computing systems, devices, computers, networks, cloud-based systems, and/or cloud-based services. For illustrative purposes, the process 600 is described from the perspective of a computer system.

Referring to the process 600 in FIG. 6, the process 600 can be performed as part of block 416 in the process 400 of FIG. 4. The process 600 can also be performed as a process that is separate from one or more blocks in the process 400 of FIG. 4.

In block 602, the computer system selects a set of bytes (e.g., a byte sequence) in a dictionary for a particular malware family. The dictionary can be the byte sequence dictionary described in reference to block 416 in the process 400.

For each position in the selected set of bytes, the computer system determines whether the position allows for a threshold-byte atom to exist in the selected set of bytes (block 604). The threshold-byte atom can be a 3-byte atom. The threshold-byte atom can also be defined as a smaller or larger byte atom. As non-limiting examples, the threshold-byte atom can be a 2-byte atom, a 4-byte atom, a 5-byte atom, a 7-byte atom, etc. As the size of the selected set of bytes increases, more bytes in the select set can be wildcarded, so long as the threshold-byte atom can still exist. As an illustrative example, if the selected set of bytes has 6 bytes, the computer system can inject wildcard bytes into $2^{nd}$, $3^{rd}$, and $4^{th}$ positions in the selected set of bytes, or any other combination of positions in the selected set of bytes, so that at least one 3-byte atom remains. Wildcarding more positions in the selected set of bytes can be advantageous to account for more variation in sequences that may arise when a malware file is compiled. For exampling, more wildcarding can help account for not knowing variable key data, ID data, and/or location of calls within binary that is compiled during runtime execution. In some implementations, the threshold-byte atom can be defined based on a malware detection rule associated with the particular malware family. In other words, if a malware detection rule is defined to search for 2-byte atoms in signature sequences, then the threshold-byte atom can be set to 2-byte atoms.

In block 604, the computer system can, for example, select a first position in the selected set of bytes and determine whether the position allows for a 3-byte atom to exist. If not, then the computer system goes to the next position and determines whether the next position allows for a 3-byte atom to exist. In the example of a set of bytes having 5 bytes, the computer system may determine that $2^{nd}$ and $4^{th}$ positions individually in the set of bytes allow for 3-byte atoms to exist. Thus, the computer system can inject wildcard bytes into the $2^{nd}$ and $4^{th}$ positions individually in the set of bytes to generate a wildcarded set of bytes. This wildcarded set of bytes can be added to the dictionary for the particular malware family.

If the position would not allow for the threshold-byte atom to exist, then the computer system proceeds to block 608 described above. If the position would allow for the threshold-byte atom to exist, then the computer system proceeds to block 606.

In block 606, the computer system can inject a wildcard byte at the position in the selected set of bytes. The computer system then proceeds to block 608.

In block 608, the computer system determines whether there are more positions in the selected set of bytes. If there are more positions, the computer system returns to block 604 and repeats blocks 604-606 for each remaining position in the set of bytes. If there are no more positions, the computer system proceeds to block 610.

In block 610, the computer system determines whether there are more sets of bytes in the dictionary to assess. The computer system can determine whether there are more sets of bytes, regardless of whether those sets already existed in the dictionary before sets of bytes were added to the dictionary in the process 400 in FIG. 4. In some implementations, the computer system may determine whether there are more sets of bytes to assess that were added to the dictionary in the process 400 and therefore were not previously part of the dictionary (e.g., previously identified and added to the dictionary at an earlier or other time).

If there are more sets of bytes to assess, the computer system returns to block 602 and repeats blocks 602-608 for the remaining sets of bytes in the dictionary. If there are no more sets to assess, the computer system proceeds to block 612.

In block 612, the computer system returns the dictionary for the particular malware family, the dictionary containing the original sets of bytes as well as the sets of bytes that have been updated with the wildcarded bytes. Therefore, this dictionary can be used to efficiently, accurately, and quickly optimize malware detection rules.

In some implementations, the process 600 can be performed as part of the second phase of deconfliction described in reference to the process 500 in FIG. 5. For example, wildcard bytes can be injected into the sequences in the dictionary before the sequences in the dictionary for the particular malware family are compared against sequences for other malware families in block 508. In some implementations, the process 600 can be performed as part of the process 400 in FIG. 4 and then performed again in the process 500. For example, any sets of bytes that remain in the dictionary for the particular malware family after the deconfliction blocks in the process 500 can then be wildcarded using the process 600.

Figure 7:
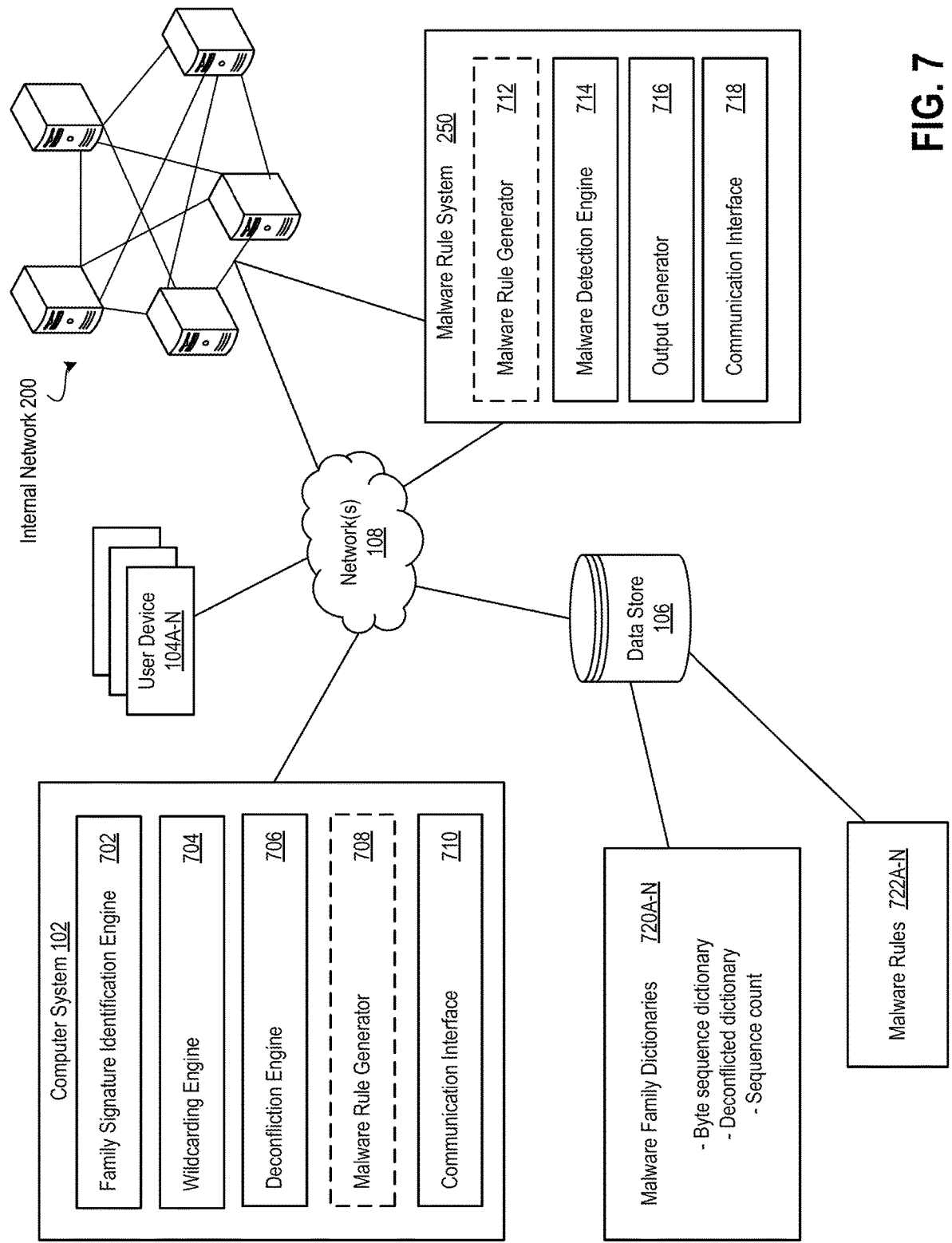
FIG. 7 is a system diagram of components that can be used to perform the techniques described herein.

FIG. 7 is a system diagram of components that can be used to perform the techniques described herein. The computer system 102, user devices 104A-N, data store 106, internal network 200, and malware rule system 250 can communicate (e.g., wired and/or wirelessly) via the network (s) 108.

The computer system 102 can include a family signature identification engine 702, a wildcarding engine 704, a deconfliction engine 706, an optional malware rule generator 708, and a communication interface 710.

The family signature identification engine 702 can be configured to perform the first phase of the disclosed techniques, which includes identifying byte sequences that are unique to a particular malware family. The engine 702 can perform the process 400 in FIG. 4. When the engine 702 identifies sequences for the particular malware family, the engine 702 can update a corresponding malware family dictionary 720A-N in the data store 106 with the identified sequences. The dictionary can, for example, be a byte sequence dictionary, as shown in FIG. 7. The engine 702 can also update a sequence count in the corresponding malware family dictionary 720A-N. As described herein, the sequence count can indicate a quantity of instances of the particular identified sequence, a quantity of malware signature samples in the particular malware family having the particular identified sequence, and/or a quantity of instances that the particular identified sequence appears in any given malware signature sample in the malware family.

The wildcarding engine 704 can be configured to inject wildcard bytes into one or more sequences in each of the malware family dictionaries 720A-N. The engine 704 can therefore perform part of the first phase described herein. The engine 704 can perform the process 600 described in FIG. 6. The engine 704 can add the sequences with the injected wildcard bytes as new sequences in the respective malware family dictionary 720A-N, thereby expanding the respective dictionary with variation in signature sequences for the particular malware family.

The deconfliction engine 706 can be configured to perform a second phase in the disclosed techniques, which is a deconfliction phase. The engine 706 can perform the process 500 described in FIG. 5. The engine 706 can, for example, retrieve a dictionary 720A for a particular malware family and compare sequences in that dictionary 720A to sequences in other dictionaries 720B-N that correspond to other malware families. If the engine 706 identifies conflicting sequences, the engine 706 removes the conflicting sequences from the dictionary 720A for the particular malware family. In some implementations, instead of removing the conflicting sequences from the dictionary 720A, the engine 706 can generate a new dictionary, such as the deconflicted dictionary shown in FIG. 7, which includes all sequences for the particular malware family that did not have conflictings in other malware families. The engine 706 may also update the sequence count for the dictionary 720A based on removing one or more conflicting sequences from the dictionary 720A.

The optional malware rule generator 708 can be configured to update and/or generate one or more malware detection rules 722A-N. The generator 708 can receive any of the dictionaries 720A-N described herein from the data store 106. Using the received dictionary, the generator 708 can update and/or generate rules for detecting and responding to a malware family that is associated with the received dictionary. The updated and/or generated rules 722A-N can then be stored in the data store 106, transmitted to one or more of the user devices 104A-N for presentation to relevant users of the internal network 200 of the enterprise, and/or transmitted to the malware rule system 250 for runtime execution.

The communication interface 710 can be configured to provide communication between the computer system 102 and one or more of the components described herein over the network(s) 108.

The user devices 104A-N can be any type of computing device described in reference to FIG. 1. The user devices 104A-N can be used by relevant users to the enterprise and the internal network 200. For example, the user devices 104A-N can be used by analysts or other users who work in security and management of network traffic for the internal network 200. The user devices 104A-N can include input devices, such as keyboards, microphones, and/or touch screens, for receiving input from the respective user. The user devices 104A-N can include output devices, such as display screens and/or speakers, for presenting information to the respective user. For example, the user devices 104A-N can present one or more of the dictionaries 720A-N and/or the rules 722A-N in a graphical user interface (GUI) display. The GUI display can be presented in a mobile application, webpage, or other type of software. The respective user can provide user input for updating one or more of the rules 722A-N based on the dictionaries 720A-N and/or other information determined by the components of the computer system 102 in the techniques described herein. The user can also view, review, and/or modify one or more of the rules 722A-N that have been updated and/or generated by the computer system 102 and/or the malware rule system 250 using the disclosed techniques.

The malware rule system 250 can include an optional malware rule generator 712, a malware detection engine 714, an output generator 176, and a communication interface 718. The malware rule system 250 can be, in some implementations, a security system implemented on the edge of the internal network 200 of the enterprise. The malware rule system 250 can include, in some implementations, a YARA rule generator. The malware rule system 250 can use the rules 722A-N to identify malware instances in network traffic that is transmitted via the network(s) 108 before entering the internal network 200. Any of the rules 722A-N can be loaded and executed by the malware rule system 250 for runtime execution.

The optional malware rule generator 712 can perform similar or same techniques as the malware rule generator 708 described above.

The malware detection engine 714 can operate in runtime. The engine 714 can monitor network traffic from systems and/or devices connected to the network(s) 108. By monitoring the network traffic, the engine 714 can execute any of the rules 722A-N and/or look for malicious files before the malicious files infiltrate the internal network 200. If one or more of the rules 722A-N are triggered by malicious files, the engine 714 can block the malicious files from entering the internal network 200. The engine 714 can also perform one or more other actions, such as generating a report about the blocked malicious files and/or the rules that were triggered or otherwise responding to the malicious files that were blocked. The engine 714 can receive or retrieve the malware rules 722A-N from the data store 106 whenever such rules are updated and/or generated. As a result, the engine 714 can monitor the network traffic in real-time with most up-to-date rules to prevent malicious files from infiltrating the internal network 200.

The output generator 716 can be configured to generate output about runtime execution of the rules 722A-N by the malware detection engine 714. For example, the engine 716 can generate output documenting what rules 722A-N were triggered, how much network traffic and what network traffic was blocked from entering the internal network 200, automated responses by the malware rule system 250 to the network traffic that was blocked and/or the rules that were triggered, and/or timestamps associated with these actions. Other actions may also be documented by the output generator 716. Output made by the generator can then be stored in the data store 106, transmitted to the computer system 102 and used to refine/update one or more of the rules 722A-N, and/or transmitted to the user devices 104A-N for presentation to the relevant user.

The communication interface 718 can provide communication between the malware rule system 250 and other components described in FIG. 7.

Figure 8:
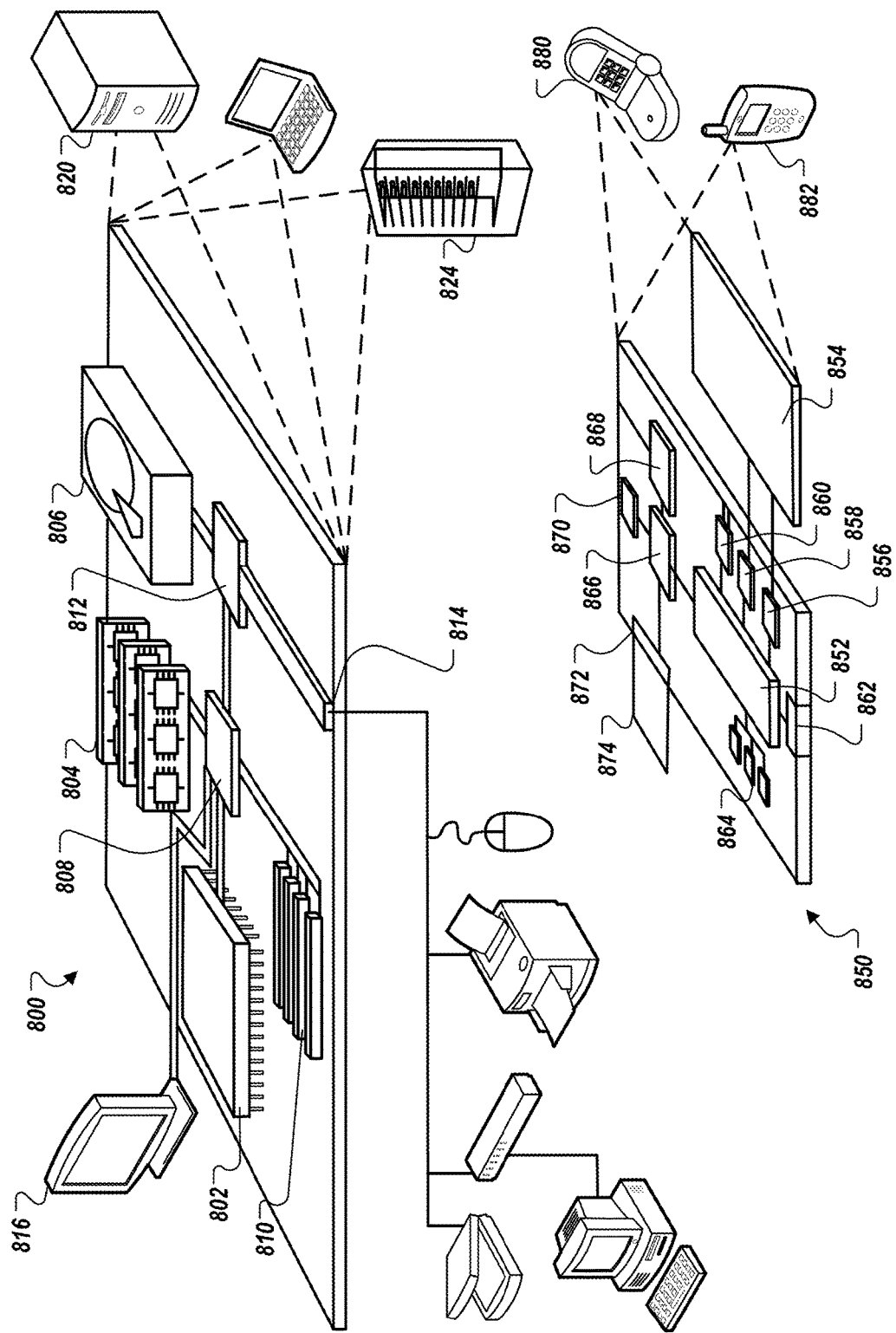
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for identifying unique byte sequences for malware families, the method comprising:
    receiving, by a computer system, a collection of malware signature samples;
    grouping, by the computer system, malware signature samples in the collection by malware family; and
    for each malware family:
        identifying, by the computer system, unique byte sequences in the malware signature samples and a number of instances of the unique byte sequences across the malware signature samples;
        adding, by the computer system, the identified unique byte sequences to a dictionary for the malware family;
        retrieving, by the computer system from a data store, a dictionary of at least another malware family;
        comparing, by the computer system, the unique byte sequences in the dictionary for the malware family with byte sequences in the dictionary of the at least another malware family;
        identifying, by the computer system, a conflicting byte sequence based on (i) the comparison and (ii) determining that a number of instances of the conflicting byte sequence across the malware signature samples in the malware family is more than a threshold number of instances;
        removing, by the computer system, the identified conflicting byte sequence from the dictionary for the malware family to generate an updated dictionary for the malware family; and
        returning, by the computer system, the updated dictionary for the malware family.

2. The method of claim 1, further comprising: updating, by the computer system, at least one of the malware detection rules having the relationship with the malware family based on at least one byte sequence in the updated dictionary.

3. The method of claim 1, further comprising: incrementing, by the computer system, a count in response to adding each of the identified unique byte sequences to the dictionary for the malware family.

4. The method of claim 3, wherein the count is the number of instances of the unique byte sequences across the malware signature samples.

5. The method of claim 3, wherein the count is a quantity of unique byte sequences that were identified for the malware family.

6. The method of claim 1, further comprising: adding, by the computer system, a subset of the unique byte sequences from the dictionary to a final dictionary for the malware family, wherein the subset of the unique byte sequences include unique byte sequences that were not removed from the dictionary based on matching the at least one byte sequence in the dictionary of the at least another malware family.

7. The method of claim 1, wherein returning, by the computer system, the updated dictionary for the malware family comprises transmitting the updated dictionary to a user device of a user in an enterprise for presentation in a graphical user interface (GUI) display.

8. The method of claim 1, wherein returning, by the computer system, the updated dictionary for the malware family comprises transmitting the updated dictionary to a malware rule system configured to update the one or more malware detection rules based on the updated dictionary and execute the one or more malware detection rules in runtime to monitor files attempting to enter an internal network of an enterprise.

9. The method of claim 1, wherein for each malware family, identifying, by the computer system, unique byte sequences in the malware signature samples to add to a dictionary for the malware family comprises:
    for each malware signature sample for the malware family, reading a threshold quantity of bytes of a byte sequence of the sample;
    adding the read threshold quantity of bytes into the dictionary for the malware family;
    reading a next set of the threshold quantity of bytes of the byte sequence of the family; and
    adding the read next set of the threshold quantity of bytes of the byte sequence into the dictionary for the malware family.

10. The method of claim 9, wherein the threshold quantity of bytes is 5 bytes.

11. The method of claim 1, wherein responsive to adding, by the computer system, the identified unique byte sequences to the dictionary for the malware family, the method further comprises:
    selecting a sequence amongst the identified unique byte sequences in the dictionary for the malware family;
    identifying a byte position in the selected sequence that allows for a threshold-byte-atom to exist in the selected sequence; and
    responsive to determining that the byte position allows for the threshold-byte-atom to exist, injecting a wildcard byte at the byte position in the selected sequence.

12. The method of claim 11, wherein the threshold-byte-atom is a 3-byte-atom.

13. The method of claim 11, wherein injecting the wildcard byte at the byte position in the selected sequence comprises generating a new sequence that includes the injected wildcard bytes at the byte position in the selected sequence and bytes at other byte positions in the selected sequence.

14. The method of claim 1, wherein the threshold number of instances is a percentage value of 20%.

15. The method of claim 1, wherein for each malware family, identifying, by the computer system, unique byte sequences in the malware signature samples to add to a dictionary for the malware family comprises adding the unique byte sequences that appear in a threshold quantity of the malware signature samples to the dictionary for the malware family.

16. The method of claim 1, wherein for each malware family, identifying, by the computer system, unique byte sequences in the malware signature samples to add to a dictionary for the malware family comprises adding each unique byte sequence in each of the malware signature samples to the dictionary for the malware family.

17. The method of claim 1, further comprising: detecting, by the computer system using a rule engine that is configured to load and execute malware detection rules that are generated using the dictionary for the malware family, malware instances in network traffic.

18. The method of claim 1, wherein grouping, by the computer system, malware signature samples in the collection by malware family is based on common characteristics amongst the malware signature samples for the family.

19. A system for identifying unique byte sequences for malware families, the system comprising:
- a computer system configured to generate malware detection rules;
- a data store configured to receive and store the malware detection rules generated by the computer system; and
- a rule engine configured to retrieve the malware detection rules from the data store and detect, using the retrieved malware detection rules, malware instances in network files,
- wherein the computer system comprises processors and memory and is configured to perform operations comprising:
  - receiving a collection of malware signature samples;
  - grouping malware signature samples in the collection by malware family; and
  - for each malware family:
    - identifying unique byte sequences in the malware signature samples and a number of instances of the unique byte sequences across the malware signature samples;
    - adding the identified unique byte sequences to a dictionary for the malware family;
    - retrieving, from the data store, a dictionary of at least another malware family;
    - comparing the unique byte sequences in the dictionary for the malware family with byte sequences in the dictionary of the at least another malware family;
    - identifying a conflicting byte sequence based on (i) the comparison and (ii) determining that a number of instances of the conflicting byte sequence across the malware signature samples in the malware family is more than a threshold number of instances;
    - removing the identified conflicting byte sequence from the dictionary for the malware family; and
    - returning the dictionary for the malware family.

20. The system of claim 19, wherein the computer system is configured to perform operations further comprising:
- generating, using the returned dictionary for the malware family, one or more malware detection rules for the malware family; and
- transmitting the one or more malware detection rules for the malware family to the rule engine for execution and detection of instances of the malware family in the network files.

* * * * *